US011757640B2

(12) United States Patent
Ferenczi

(10) Patent No.: US 11,757,640 B2
(45) Date of Patent: Sep. 12, 2023

(54) NON-FUNGIBLE TOKEN AUTHENTICATION

(71) Applicant: American Express Travel Related Services Company, Inc., New York, NY (US)

(72) Inventor: Andras L. Ferenczi, Peoria, AZ (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 188 days.

(21) Appl. No.: 17/386,236

(22) Filed: Jul. 27, 2021

(65) Prior Publication Data
US 2023/0034169 A1    Feb. 2, 2023

(51) Int. Cl.
*H04L 9/32*     (2006.01)
*H04L 9/08*     (2006.01)
(Continued)

(52) U.S. Cl.
CPC .......... *H04L 9/3213* (2013.01); *H04L 9/0825* (2013.01); *H04L 9/0863* (2013.01);
(Continued)

(58) Field of Classification Search
None
See application file for complete search history.

(56) References Cited

U.S. PATENT DOCUMENTS

| 6,971,017 B2 | 11/2005 | Stringer |
| 11,308,487 B1 * | 4/2022 | Foster ................ G06Q 20/3829 |

(Continued)

FOREIGN PATENT DOCUMENTS

| KR | 1020190132052 A | 11/2019 | |
| WO | WO-2021033262 A1 * | 2/2021 | ........... H04L 9/3236 |
| WO | WO-2022197976 A1 * | 9/2022 | ........... G06F 21/602 |

OTHER PUBLICATIONS

Written Opinion of the International Searching Authority in related PCT Application No. PCT/US2022/074055 dated Nov. 14, 2022.

(Continued)

*Primary Examiner* — Benjamin E Lanier
(74) *Attorney, Agent, or Firm* — Thomas | Horstemeyer, LLP

(57) ABSTRACT

Disclosed are various embodiments for authenticating a user using non-fungible tokens (NFTs). A trusted token issuer verifies a user's identity according to identifying credentials (e.g., government issued identification, passport, driver's license, etc.) presented by the user and creates a non-fungible token in response to verifying the credentials. The non-fungible token is associated with a user identifier and can be used by an access provider to authenticate a user requesting access to restricted content provided by the access provider. For example, when a client device associated with the user requests access from an access provider to an access-restricted website or other type of access-restricted area (e.g., building, concert venue, network, etc.), the access provider (e.g., website server, building computing device, venue system, etc.) uses the properties of the non-fungible token to verify one's identity and permit access upon verification.

20 Claims, 6 Drawing Sheets

(51) Int. Cl.
*H04L 9/40* (2022.01)
*H04L 9/00* (2022.01)

(52) U.S. Cl.
CPC .......... *H04L 9/3247* (2013.01); *H04L 9/3271* (2013.01); *H04L 63/083* (2013.01); *H04L 63/0807* (2013.01); *H04L 9/50* (2022.05)

(56) References Cited

U.S. PATENT DOCUMENTS

| | | |
|---|---|---|
| 2015/0222435 A1 | 8/2015 | Lea |
| 2018/0374091 A1 | 12/2018 | Madisetti |
| 2019/0366475 A1 | 12/2019 | Scarselli |
| 2022/0318233 A1* | 10/2022 | Martinez ............. G06F 16/2379 |

OTHER PUBLICATIONS

International Search Report in related PCT Application No. PCT/US2022/074055 dated Nov. 14, 2022.

* cited by examiner

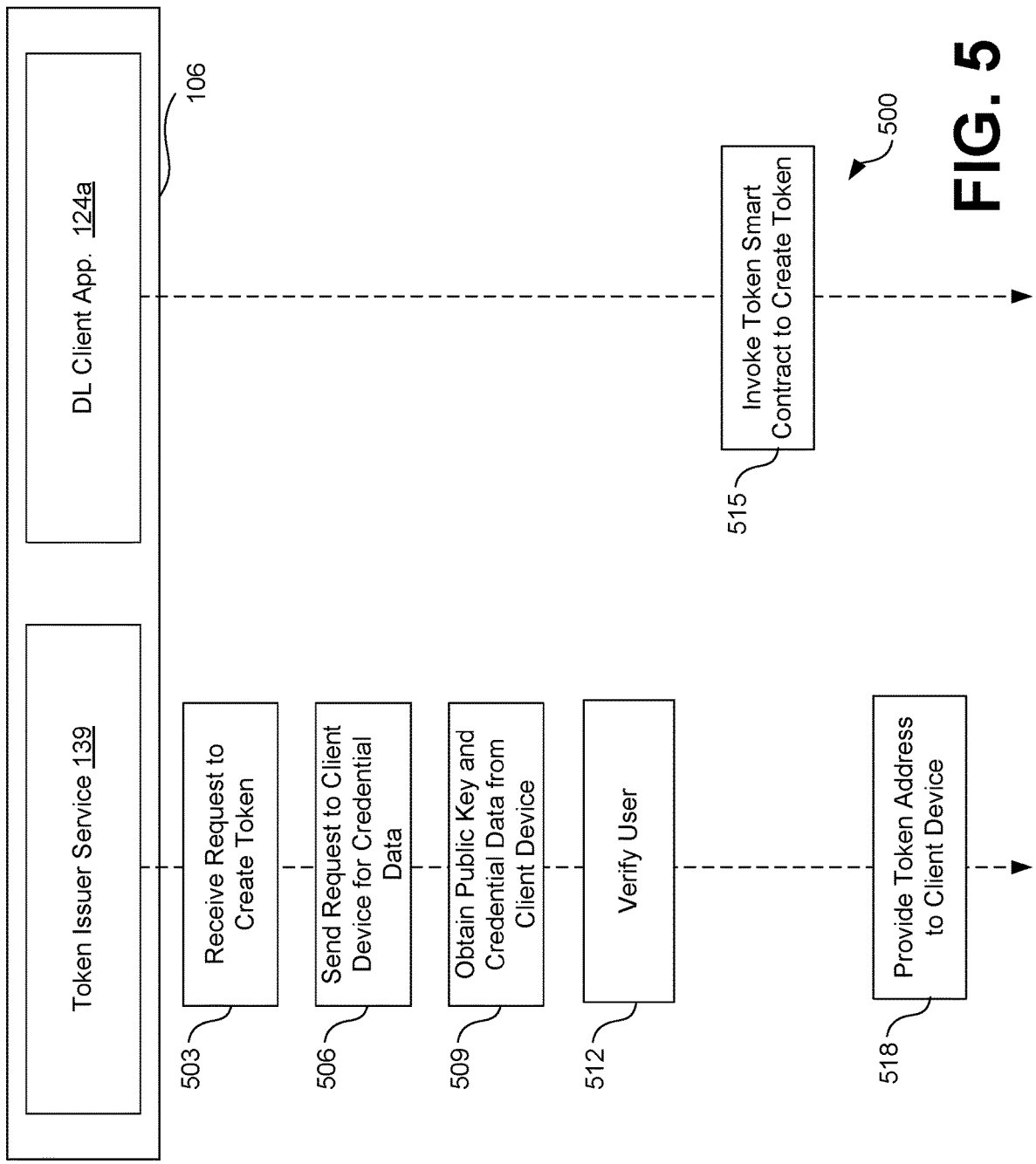

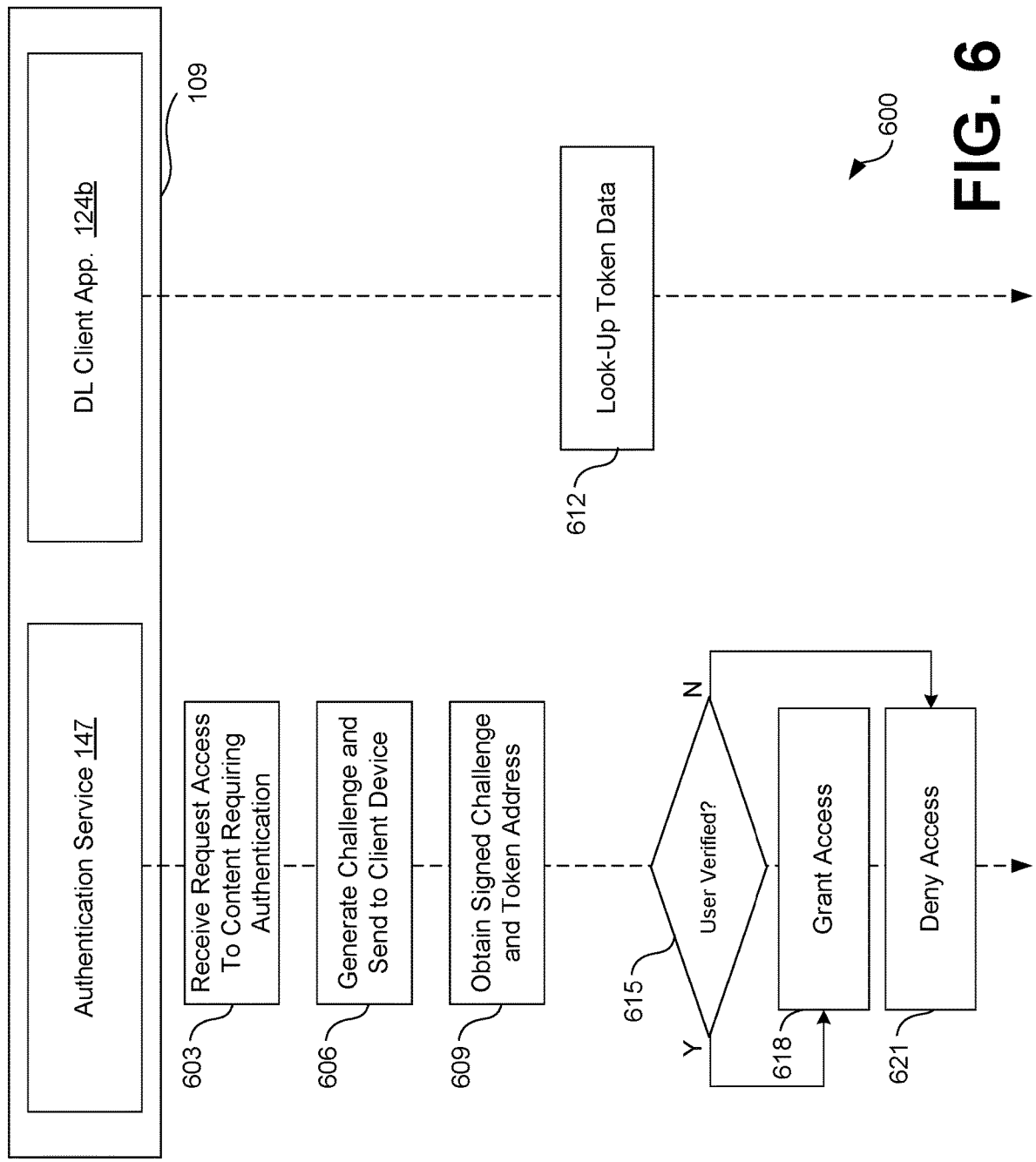

NON-FUNGIBLE TOKEN AUTHENTICATION

BACKGROUND

Many websites require users to log in with a username and password so that the users can be authenticated prior to accessing secure content. An authenticating entity associated with the website can store the username and a hash of the password in its database and authenticate the requesting user based on a comparison of what is provided by the user and what is stored. However, this can be insecure and lack privacy, as the user will often provide an email address, a phone number, or other unique identifier as a username. In addition, the use of a username and password combination for authentication can lack flexibility. In particular, to enable multi-site access, some form of federated authentication needs to be implemented, which can require a complex infrastructure setup. Improving the security and ease of user authentication while preserving the privacy of the user is a constant need.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 illustrates an example of the functionality associated with the creation of a non-fungible token (NFT) associated with a user identity according to various embodiments of the present disclosure.

FIG. 3 depicts an example of the functionality associated with the authentication of a user using an NFT according to various embodiments of the present disclosure.

FIG. 4 depicts an example of the functionality a client application with respect to the request to create the NFT according to various embodiments.

FIG. 5 is a sequence diagram illustrating an example of functionality implemented as a portion of the network environment of FIG. 1 according to various embodiments of the present disclosure. In particular, FIG. 5 depicts an example of the functionality associated with the creation of the NFT for a given user according to various embodiments.

FIG. 6 is a sequence diagram illustrating an example of functionality implemented as a portion of the network environment of FIG. 1 according to various embodiments of the present disclosure. In particular, FIG. 6 depicts an example of the functionality associated with authenticating a user for access-restricted content according to the NFT according to various embodiments.

DETAILED DESCRIPTION

Figure 1:
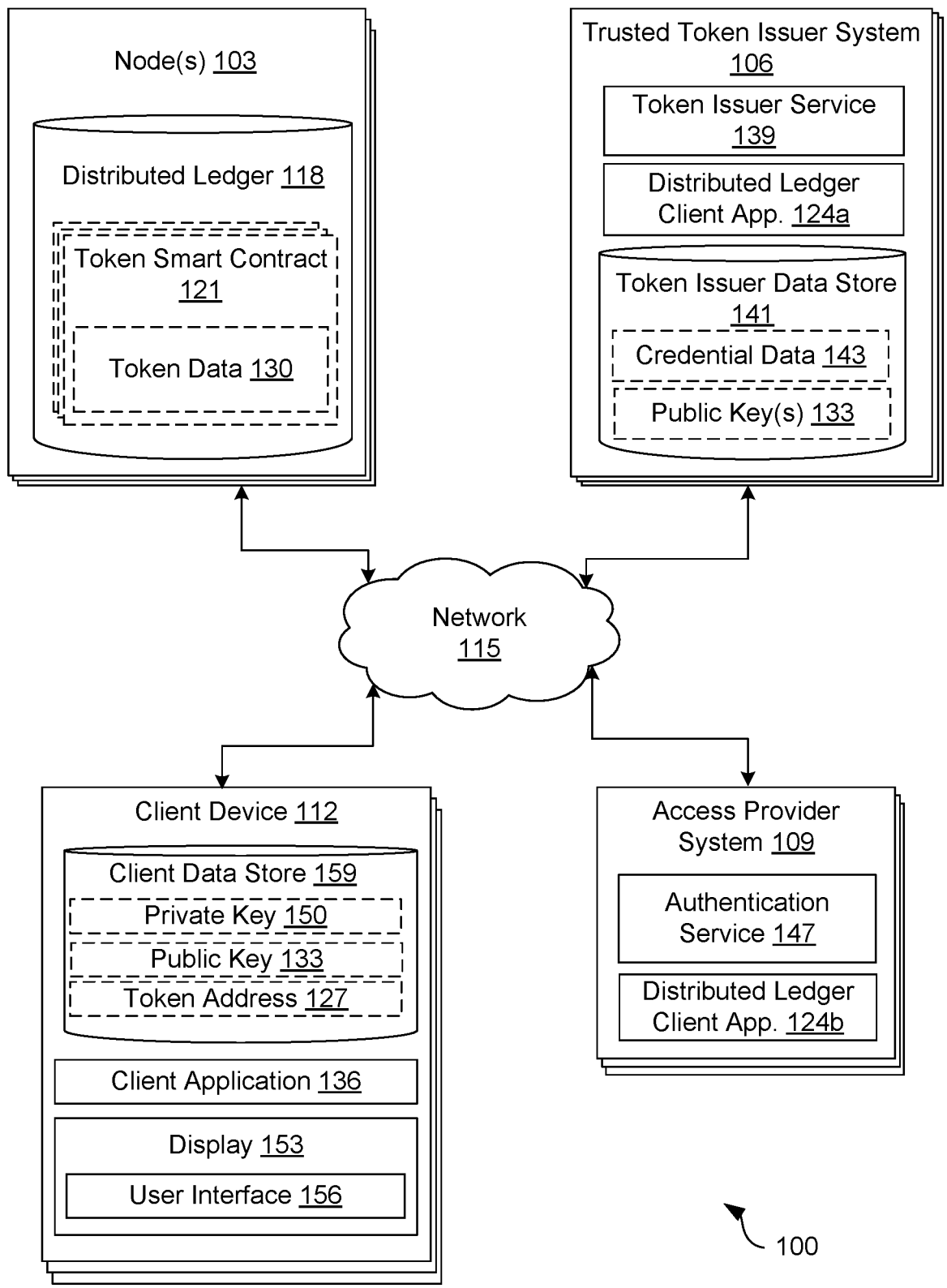
FIG. 1 is a drawing of a network environment according to various embodiments of the present disclosure.

Disclosed are various approaches for authenticating the identity of user using non-fungible tokens (NFTs). An NFT is a unique digital identifier that is recorded on a distributed ledger and can be used to certify authenticity and ownership of a given digital or real asset (e.g., artwork, recordings, digital images, etc.). According to various embodiments, the asset associated with the NFTs of the present disclosure corresponds to a credential verification of the user's identity. In various examples, a token issuer verifies a user's identity according to identifying credentials (e.g., government issued identification, passport, driver's license, etc.) presented by the user and creates a non-fungible token in response to verifying the credentials. The non-fungible token is associated with a user identifier and can be used by an access provider to authenticate a user requesting access to restricted content provided by the access provider. For example, when a client device associated with the user requests access from an access provider to an access-restricted website or other type of access-restricted area (e.g., building, concert venue, network, etc.), the access provider (e.g., website server, building computing device, venue system, etc.) uses the properties of the non-fungible token to verify one's identity and permit access upon verification.

According to various examples, a client device associated with a user requesting a non-fungible credential token generates a cryptographic key-pair comprising a private key and a public key. Upon sending a request to a token issuer to create the non-fungible token, the client device provides the public key to the token issuer. The token issuer creates the non-fungible token for the user by invoking an NFT smart contract on a distributed ledger (e.g., blockchain) that is associated with the token issuer. The non-fungible token created by the token issuer includes a mapping of the public key (or other type of unique user identifier) with a credential ticket that indicates verification of the given user or user account.

In various examples, the private key of the cryptographic key-pair is encrypted and stored on the client device and is used by the client device to sign a cryptographic challenge provided by an access provider in response to a request to the access provider for access to restricted content or a restricted location. The access provider accesses the non-fungible token using an associated address that is either well-known with respect to the token issuer and/or provided by the client device requesting authentication. Upon determining that the challenge is signed with the private key that corresponds to the public key included in the non-fungible token, the access provider authenticates the user and/or user account associated with the request and access is granted.

In various examples, access providers select the token issuers that are considered trustworthy. For example, an access provider can permit the use of authentication by NFTs for NFTs that are created by and/or transferred to token issuers that are considered trusted by the access provider. If an NFT associated with a given user or user account is not created and/or transferred to a token issuer that is considered trustworthy by the access provider, the user will be unable to authenticate with the access provider using the NFT techniques of the present disclosure.

In some examples, users can have multiple NFTs that are created by different token issuers. For example, a user can have a first NFT that is created by a first token issuer and a second NFT that is created by a second token issuer. Both the first NFT and the second NFT can be used by an access provider for authentication. This can be helpful in instances where a given access provider only permits tokens created by the first token issuer and not the second token issuer.

According to various embodiments, the NFTs of the present disclosure can be used for authentication for multiple different types of access. For example, an enterprise can require a key-card access to enter into the premises of the enterprise and also require a username and password to login to the enterprise network. Using this example, the same NFT can be used to permit access into both the enterprise premises and the enterprise computing workspace. Upon termination of the employee, the enterprise can update its internal authorization system to not authorize access to a user who presents this NFT, thereby providing additional security to the enterprise.

With reference to FIG. 1, shown is a network environment 100 according to various embodiments. The network environment 100 includes a plurality of nodes 103, a trusted token issuer system 106, an access provider system 109, and one or more client devices 112 which are in data communication with each other via a network 115. The network 115 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

A node 103 can be a computer system or device that includes a processor, a memory, a network interface, and various other hardware. Such a computer system can be embodied in the form of a desktop computer, a laptop computer, server computer, or other devices providing computing capability. In some instances, the token issuer system 106, the access provider system 109, and the client device 112 can each operate as a node 103. Each node 103 can contain a replicated copy of a distributed ledger 118, including all data stored in the distributed ledger 118.

The distributed ledger 118 represents a synchronized, eventually consistent, data store spread across multiple nodes 103, some or all of which can be in different geographic or network locations. Records of transactions involving the distributed ledger 118 can be shared or replicated using a peer-to-peer network connecting the individual nodes 103 that can write to the distributed ledger 118. Once a transaction or record is recorded in the distributed ledger 118, it can be replicated across the peer-to-peer network until the record is eventually recorded with all of the nodes 103. Various consensus methods can be used to ensure that data is written reliably to the distributed ledger 118. Examples of a distributed ledger can include blockchains, distributed hash tables (DHTs), and similar data structures.

Various data can also be stored in a distributed ledger 118. This can include one or more token smart contract(s) 121 and/or other information. However, any other data discussed in the present disclosure could also be stored in the distributed ledger 118 if the public availability of the data were acceptable in that particular implementation.

The token smart contract 121 corresponds to a script or other executable which can be stored in the distributed ledger 118 on a node 103 and executed by individual host or peers (e.g., nodes 103) associated with the distributed ledger 118. When a computation is performed by the token smart contract 121, each host or peer that forms the distributed ledger 118 can perform the computation and compare its result with the results computed by other hosts or peers. When a sufficient number of hosts or peers forming the distributed ledger 118 agree on the result of the computation, the result can be stored in the distributed ledger 118. According to various examples, an NFT used for user authentication is created by invoking a token smart contract 121 that is associated with the token issuer. An example of a token smart contract 121 is an ERC-721 smart contract used in the ETHEREUM platform, although other distributed ledger or blockchain-based technologies provide the same or similar functionality.

According to various examples, the token smart contract 121 corresponds to an NFT that is created for a given user credential. When the token smart contract 121 is invoked by a distributed ledger client application 124a of the trusted token issuer system 106, the corresponding NFT is created. According to various examples, each token smart contract 121 recorded on the distributed ledger 118 is associated with a given token issuer system 106 and the token address 127 of the token smart contract 121 that corresponds to the token issuer.

The token smart contract 121 includes token data 130 that defines the attributes of a given NFT. For example, the token data 130 includes a mapping of a user identifier and a credential ticket. The user identifier is unique to the user. In various examples, the user identifier corresponds to a public key 133 of a key-pair generated by a client application 136 executed on the client device 112. In accordance to various embodiments, the authentication service 147 executed on the access provider system 109 validates or otherwise authenticates a user and/or user account requesting access by accessing the token smart contract 121 and determining that the user identifier (e.g., public key 133) associated with the requesting user and/or user account is included in the token data 130. The credential ticket that is mapped to the user identifier corresponds to an identification of the credential asset of the user or user account that the NFT is used to represent.

The trusted token issuer system 106 is an entity that has a known reputation with the access provider of the access provider system 109 that meets a given threshold to be considered trusted. In various examples, the trusted token issuer system 106 corresponds to a trusted internet-related service provider (e.g., GOOGLE®, FACEBOOK®), a trusted government entity (e.g., Department of Motor Vehicles, the United States Postal Service, etc.), or other type of trusted entity.

The trusted token issuer system 106 can be representative of a plurality of computing devices coupled to the network 115. The trusted token issuer system 106 can include a corresponding computer system or computing device with a processor and a memory. Such a computer system is embodied in the form of a personal computer (e.g., a desktop computer, a laptop computer, or similar device), a cluster of computing devices, servers, virtualized computing systems, or other devices with like capability.

Various applications or other functionality can be executed by the trusted token issuer system 106 according to various embodiments. The components executed on the trusted token issuer system 106 can include a token issuer service 139, the distributed ledger client application 124a, and other applications, services, processes, systems, engines, or functionality not discussed in detail herein.

The token issuer service 139 executed by the token issuer system 106 interacts with the client application 136 of the client device 112 by receiving requests for creating a non-fungible token that is to be associated with an authentication of a user and receiving credential data 143 that is used to verify the identity of the requesting user. In addition, the token issuer service 139 analyzes the user credentials included in the credential data 143 (e.g., government issued identification, passport, driver's license, etc.) to verify the identity of the requesting user and/or user account. For example, the token issuer service 138 can apply various image and text recognition techniques such as optical character recognition (OCR) to extract information from the credential data 143 for analysis to determine authenticity for user verification.

In various examples, the token issuer service 139 further receives a public key 133 from the client application 136. The public key 133 corresponds to a public key of an asymmetric cryptographic key-pair that is created by the client application 136 and is unique to the user and/or user account associated with client device 112. The public key 133 is provided by the distributed ledger client application 124a in the call to the nodes 103 to invoke the token smart contract 121 to create the non-fungible token for the given user and/or user account. The non-fungible token is created to include the public key 133 in the mapping of the corresponding smart contract 121.

Upon verifying the identity of the user, the token issuer service 139 directs the distributed ledger client application 124a to create a non-fungible token by invoking a token smart contract 121 associated with the token issuer system 106 on the distributed ledger 118. The distributed ledger client application 147a can send or otherwise broadcast a request to invoke the token smart contract 121 on the distributed ledger 118 for creation of the non-fungible token on the distributed ledger 118. The request or broadcast can be received by the nodes 103 associated with the distributed ledger 118. For example, the distributed ledger client application 124a can make an application programming interface (API) call that includes the public key 133 or other type of user identifier to invoke the token smart contract 121 that is associated the token issuer system 106. The token smart contract 121 can execute on the nodes 103 of the distributed ledger 118 to create and record on the distributed ledger 118 the non-fungible token that is to be uniquely associated with the verified user and/or user account.

Also, various data is stored in a token issuer data store 141 that is accessible to the token issuer system 106. The token issuer data store 141 can be representative of a plurality of token issuer data stores 141, which can include relational databases, object-oriented databases, hierarchical databases, hash tables or similar key-value data stores, as well as other data storage applications or data structures. The data stored in the token issuer data stores 141 is associated with the operation of the various applications or functional entities described below. This data can include credential data 144, a public key 133, and potentially other data.

The credential data 144 corresponds to data that is provided by the user and/or client device 112 associated with the user requesting the token. The credential data 144 can include, for example, images of one or more of a passport, a state-issued identification card, a driver's license, a military-issued identification card, and/or other type of identification data that can be used to verify a particular user.

The public key 133 corresponds to a public key of an asymmetric cryptographic key-pair that is created by the client application 136 on the client device 112 and is used to create the non-fungible token that is to be uniquely associated with the user for authentication. In various examples, the public key 133 is included in a request to invoke the token smart contract 121 on the distributed ledger 118 to generate and/or mint a non-fungible token for user authentication. The public key 133 is included in mapping of the token smart contract 121 of the non-fungible token and is used by the access provider system 109 to verify a user or user account associated with a client device.

The access provider system 109 is an entity that provides users access to content served up by the access provider system 109, access to enter premises that are access-restricted (e.g., concert venues, enterprise buildings), and/or other type of access. For example, the access provider system 109 can correspond to a website server that serves up or otherwise distributes webpages or other type of content to a requesting client device 112. In various examples, access to a given webpage of the website can require user authentication. Instead of requiring the user to provide a user name and password for user authentication, the access provider system 109 can interact with the client application 136 and the corresponding token smart contract 121 to authenticate the user prior to transmitting the given webpage (e.g., permitting access) to the client device 112. In another example, the access provider system 109 can be associated with an enterprise and can verify the identity of users requesting access into the premises of the enterprise, an enterprise network, and/or other areas that can be access-restricted in association with an enterprise. In this example, the access provider system 109 interacts with the client device 112 associated with the user requesting access and the corresponding token smart contract 121 to verify the user's identity and permit access to restricted areas (e.g., content, network, buildings, applications, etc.), associated with the enterprise.

The access provider system 109 can be representative of a plurality of computing devices that can be coupled to the network 115. The access provider system 109 can include a corresponding computer system or computing device with a processor and a memory. Such a computer system is embodied in the form of a personal computer (e.g., a desktop computer, a laptop computer, or similar device), a cluster of computing devices, servers, virtualized computing systems, or other devices with like capability.

Various applications or other functionality can be executed by the access provider system 109 according to various embodiments. The components executed on the trusted token issuer system 106 can include an authentication service 147, a distributed ledger client application 124b, and other applications, services, processes, systems, engines, or functionality not discussed in detail herein.

The authentication service 147 authenticates a user and/or user account associated with the client device 112 requesting access to content and/or access-restricted areas that require user authentication. In various examples, in response to receiving a request to access content that requires user authentication, the authentication service 147 generates a cryptographic challenge to send to the client device 112. In various examples, the cryptographic challenge comprises an arbitrary sequence of alphanumeric characters, one or more random phrases, or other type of random string of alphanumeric characters or phrases. In some examples, the cryptographic challenge may comprise a question requesting and answer by the recipient of the cryptographic challenge. In this examples, the client device 112 receiving the cryptographic challenge may answer the challenge by signing the challenge or otherwise encrypting the challenge using the private key 150 of the cryptographic key-pair generated by the client application 136. The cryptographic challenge is generated as an authentication technique to allow the authentication service 147 to authenticate the user and/or user account.

In response to receiving the cryptographic challenge from the authentication service 147, the client application 136 signs the cryptographic challenge with the private key 150 of the cryptographic key-pair generated by the client application 136. The private key 150 corresponds to the public key 133 used by the token issuer system 106 to create the non-fungible token. In addition to receiving the signed cryptographic challenge, the authentication service 147 receives, from the client application 136, a token address 127 corresponding to the address of the non-fungible token associated with the user and/or user account.

In various examples, the authentication service 147 directs the distributed ledger client application 124b to access the token smart contract 121 corresponding to the non-fungible token using the provided token address 127 and look-up the token data 130 associated with the token smart contract 121. The authentication service 147 determines whether the token data 130 includes the public key 133 that corresponds to the private key 150 used to sign the cryptographic challenge.

For example, the cryptographic challenge is signed by the client application 136 by encrypting the cryptographic challenge using the private key 150. The authentication service 147 determines that the public key 133 included in the token data 130 corresponds to the private key 150 when the cryptographic challenge that is encrypted using the private key 150 is decrypted with the public key 133. In addition, the authentication service 147 verifies that the cryptographic challenge matches the original cryptographic challenge provided to the client application 136. Upon verifying the identity of the user and confirming that the signed challenge is the same challenge that was originally provided, the authentication service 147 authenticates the user and permits the requested access.

The distributed ledger client application 124b sends or otherwise broadcasts a request to look-up the non-fungible token corresponding to the token smart contract 121 on the distributed ledger 118 using the token address 127 provided by the client application 136. The request or broadcast is received by the nodes 103 associated with the distributed ledger 118. For example, the distributed ledger client application 124b can make an application programming interface (API) call that includes the token address 127 to look-up the token smart contract 121 and obtain the token data 130 including the public key 133.

A client device 112 can be a computer system or device that includes a processor, a memory, a network interface, and various other hardware. Such a computer system can be embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability. The client device 112 can include one or more displays 153, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 112 or can be connected to the client device 112 through a wired or wireless connection.

The client device 112 is configured to execute various applications such as a client application 136 or other applications. In various examples, the client application 136 is executed in a client device 112 to request access to and access restricted content served up by the access provider system 109, the trusted token issuer system 106, or other devices or datastores, thereby rendering a user interface 156 on a display 153. To this end, the client application 136 can include a browser, a dedicated application, or other executable, and the user interface can include a web page, an application screen, or other user mechanism for obtaining user input.

The client data store 159 represents mass storage or memory in which the client device 112 can store information. The client data store 159 can include a public key 133, a private key 150, a token address 127, and other data. The public key 133 and the private key 150 correspond to an asymmetric cryptographic key-pair that is generated for the creation of a non-fungible token and for authentication of the user and/or user account in accordance to various embodiments. The key-pair can be generated using various approaches, such as elliptic curve cryptography (ECC) approaches or using the Rivest-Shamir-Adleman (RSA) algorithm.

The token address 127 corresponds to a location of the token smart contract 121 corresponding to the user's NFT within the distributed ledger 118. In various examples, the token address 127 is publicly available and is associated with the token issuer system 106. The token address 127 corresponds to a unique sequence of number, letters, and/or functions and refers to a specific destination associated with the token smart contract 121.

Figure 2:
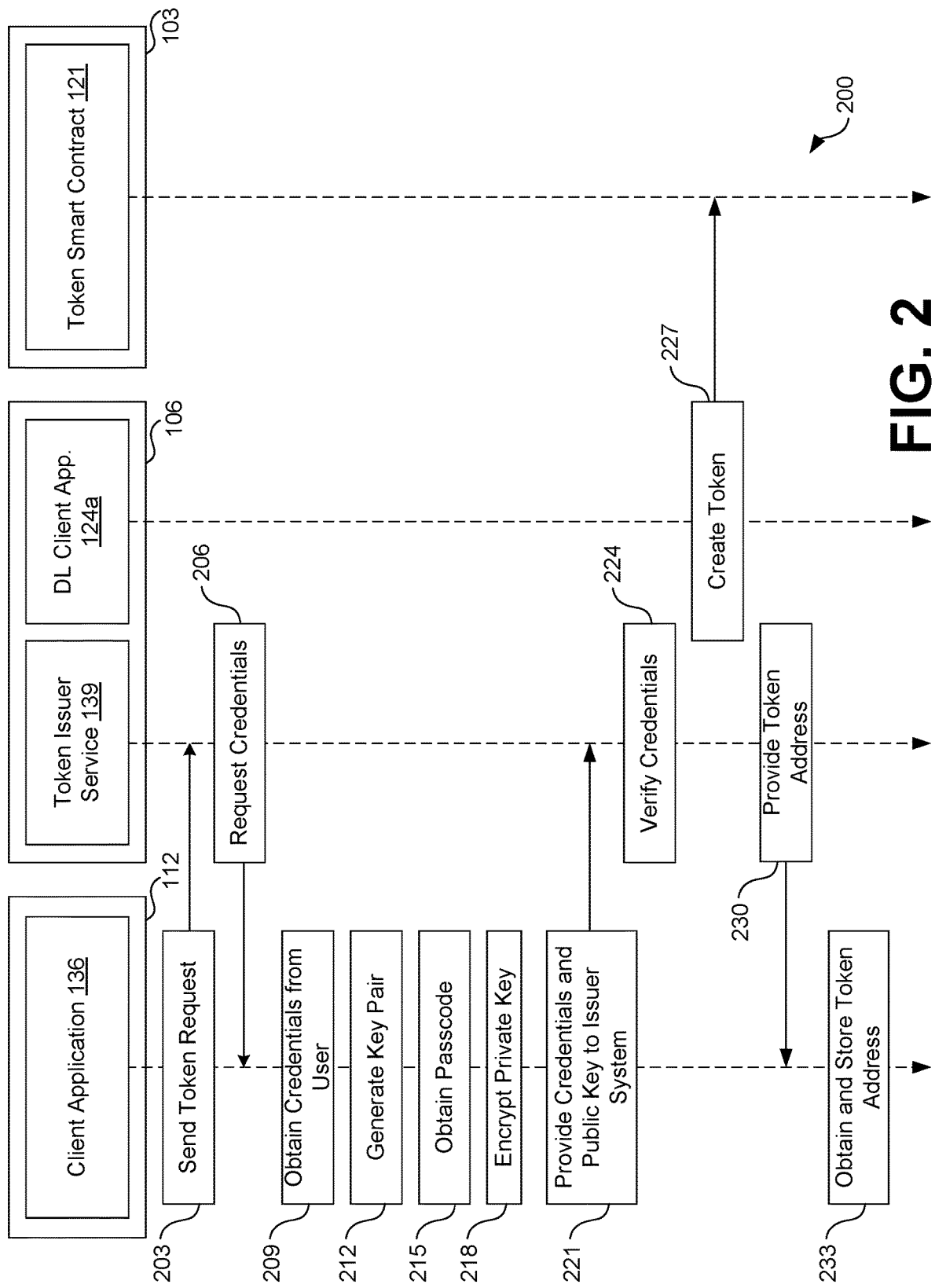
FIG. 2 is a sequence diagram illustrating an example of functionality implemented as a portion of the network environment of FIG. 1 according to various embodiments of the present disclosure. In particular.

Next, a general description of the operation of the various components of the networked environment 100 is provided with reference to FIGS. 2-6. To begin, FIG. 2 illustrates a sequence diagram 200 that provides an example of the operation of the components of the network environment 100. It is understood that the sequence diagram 200 of FIG. 2 provides merely an example of the many different types of functional arrangements that can be employed to implement the operation of the depicted portion of the network environment 100. As an alternative, the sequence diagram 200 of FIG. 2 can be viewed as depicting an example of elements of a method implemented within the network environment 100. In particular, the sequence diagram 200 of FIG. 2 depicts the functionality associated with the creation of an NFT for a particular user and/or user account associated with a client device 112 according to various embodiments of the present disclosure.

To begin, at block 203, the client application 136 executed on the client device 112 sends a create token request to the token issuer service 139 of a trusted token issuer system 106. For example, the client application 136 interacts with the token issuer service 139 which serves up content associated with a user interface 156 that is configured to facilitate a creation of an NFT for user authentication. A user interacting with the user interface 156 rendered on the client device 112 can select a component that generates the create token request and sends the created token request to the token issuer service 139.

At block 206, the token issuer service 139 sends a request for identifying credentials associated with the user requesting the NFT. In various examples, the token issuer service 139 transmits user interface code that is executable by the client application 136 to generate, modify, and/or render a user interface 156 that facilitates the request for and upload of credential data 143 associated with the user.

At block 209, the client application 136 obtains or otherwise uploads the credential data 143 (e.g., driver's license image, passport image, etc.) stored in a client data store 159 of the client device 112 via the user interface 156 associated with the client application 136. In some examples, the client application 136 interacts with an image capturing device associated with the client device 112 to capture or otherwise scan an image of the one or more credentials associated with the user.

At block 212, the client application 136 generates an asymmetric cryptographic key-pair comprising a public key 133 and a private key 150. The key-pair can be generated using various approaches, such as elliptic curve cryptography (ECC) approaches or using the Rivest-Shamir-Adleman (RSA) algorithm. According to various embodiments, the public key 133 and the private key 150 are used by the various components of the networked environment 100 to facilitate the creation of the NFT and authentication of the user according to the NFT in accordance to various embodiments. In particular, the public key 133 is used to create the NFT while the private key 150 is encrypted and stored on the client device 112. The private key 150 is used to sign a cryptographic challenge received from an access provider system 109. The access provider system 109 verifies the user by determining that the public key 133 associated with the NFT corresponds with the private key 150 used to sign the cryptographic challenge.

At block 215, the client application 136 obtains a passcode from the user interacting with the client application 136. For example, the client application 136 generates and renders a pop-up box or other type of user interface component requesting the user enter a particular passcode. The passcode can comprise a numeric sequence of numbers (e.g., four to six digits) that is provided by the user.

At block 218, the client application 136 encrypts the private key 150 using the passcode provided by the user. The encrypted private key 150 is stored in the client data store 159 and the passcode is removed from the client device 112 to ensure security with respect to access of the private key 150. For example, the private key 150 can only be decrypted using the same passcode that was used to encrypt the private key 150.

At block 221, the client application 136 provides the credential data 143 and the public key 133 to the token issuer service 139 on the trusted token issuer system 106. For example, the client application 136 transmits the credential data 143 and public key 133 over the network 115 to the token issuer service 139 in response to the request for credentials that was previously received from the token issuer service 139.

At block 224, the token issuer service 139 analyzes the credential data 143 (e.g., government issued identification, passport, driver's license, etc.) to verify the identity of the requesting user or user account. For example, the token issuer service 138 can apply various image and text recognition techniques such as, for example, optical character recognition (OCR) to extract information from the credential data 143 for analysis to determine authenticity for user verification. Upon verification of the user following a review and confirmation of the identification, the token issuer service 139 directs the distributed ledger client application 124a to create the NFT for the given user.

At block 227, the distributed ledger client application 124a creates the NFT for the given user by invoking the token smart contract 121 associated with the token issuer system 106. For example, the distributed ledger client application 124a can make an application programming interface (API) call that includes the public key 133 or other type of user identifier to invoke the token smart contract 121 that is associated the token issuer system 106. The token smart contract 121 executes on the nodes 103 of the distributed ledger 118 to create and record on the distributed ledger 118 the non-fungible token that is to be uniquely associated with the verified user and/or user account. In particular the mapping of the token smart contract 121 corresponding to the NFT includes a reference to the public key 133.

At block 230, the token issuer service 139 provides the token address 127 to the client application 136. The token address 127 is associated with the location of the token smart contract 121 corresponding to the created NFT on the distributed ledger 118. In various examples, the token address 127 is publicly available and is further associated with the token issuer system 106. The token address 127 corresponds to a unique sequence of number, letters, and/or functions and refers to a specific destination associated with the token smart contract 121 corresponding to the NFT.

At block 233, the client application 136 obtains the token address 127 from the token issuer service 139. The client application 136 further stores the token address 127 in the client data store 159. During the authentication of a user by the access provider, the client application 136 provides the access provider system 109 the stored token address. Thereafter, this portion of the process proceeds to completion.

Figure 3:
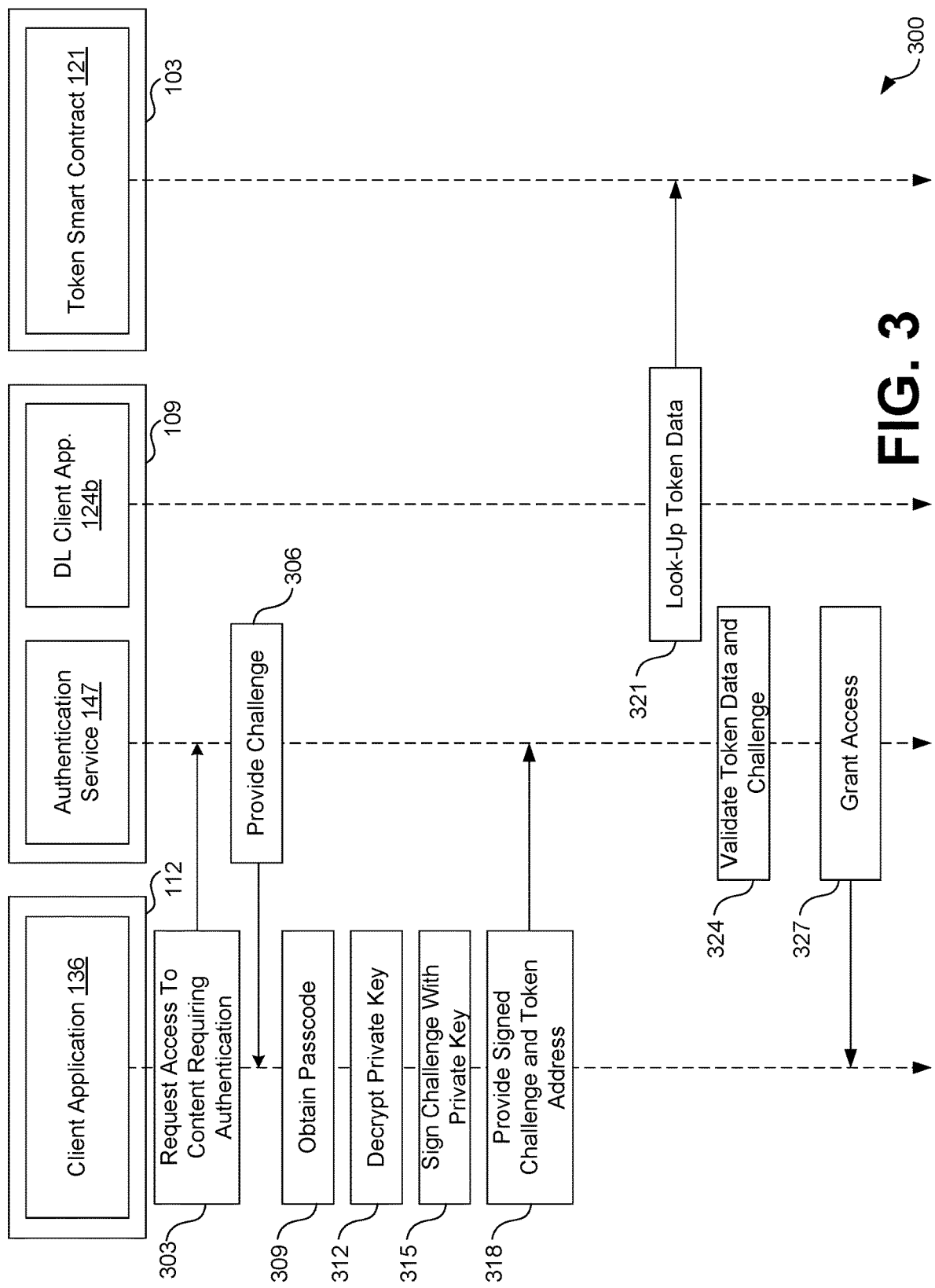
FIG. 3 is a sequence diagram illustrating an example of functionality implemented as a portion of the network environment of FIG. 1 according to various embodiments of the present disclosure. In particular.

Referring next to FIG. 3, shown is a sequence diagram 300 that provides an example of the operation of the components of the network environment 100. It is understood that the sequence diagram 300 of FIG. 3 provides merely an example of the many different types of functional arrangements that can be employed to implement the operation of the depicted portion of the network environment 100. As an alternative, the sequence diagram 300 of FIG. 3 can be viewed as depicting an example of elements of a method implemented within the network environment 100. In particular, sequence diagram 300 of FIG. 3 depicts the functionality associated with the authentication of a user in response to a user requesting access to content or other access permitted area associated with the access provider system 109 according to various embodiments of the present disclosure.

At block 303, the client application 136 executing on the client device 112 sends a request to authentication service 147 of the access provider system 109 requesting access to content that is provided by the access provider system 109 and requires authentication of the user before access to the content is permitted. For example, a user interacting with the client application 126 can request access to restricted content associated with a website of the access provider system 109 via one or more user interactions with a user interface 156 rendered on the display 153 of the client device 112. Prior to being provided the content by the access provider system 109, the requesting user must be authenticated.

At block 306, the authentication service 147 generates a cryptographic challenge unique to the given request. The authentication service 147 sends the generated cryptographic challenge to client application 136. In various examples, the cryptographic challenge comprises an arbitrary sequence of alphanumeric characters. In various examples, the authentication service 147 associates the cryptographic challenge created for the given request and/or user for later verification in order to prevent of any type of replay attack.

At block 309, the client application 239 obtains a passcode from the user interacting with the client application 136. For example, the client application 136 generates and renders a pop-up box or other type of user interface component requesting the user enter a particular passcode. The passcode can comprise a numeric sequence of numbers (e.g., four to six digits) that is provided by the user. This passcode obtained from the user should match the passcode obtained from the user at block 215 of FIG. 2 during the creation of the NFT for the user.

At block 312, the client application 239 obtains the encrypted private key 150 from the client data store 159 and decrypts the private key 150 using the passcode obtained from the user. As the passcode obtained from the user should match the passcode obtained during the NFT creation process of FIG. 2, the private key 150 can be decrypted using the passcode.

At block 315, the client application 136 signs the cryptographic challenge received from the authentication service 147 using the decrypted private key 150. For example, the authentication service 147 can sign the cryptographic challenge by encrypting the cryptographic challenge using the private key 150.

At block 318, the client application 136 provides the signed challenge and token address 127 associated with the created NFT to the authentication service 147. For example, the client application 136 transmits the signed challenge and the token address 127 to the authentication service 147 over the network 115. The token address 127 is associated with the location of the token smart contract 121 corresponding to the NFT on the distributed ledger 118.

At block 321, the distributed ledger client application 124b of the access provider system 109 uses the received token address 127 to look-up the token data 130 associated with the token smart contract 121 corresponding to the NFT for the user credentials. In various examples, the distributed ledger client application 124b sends or otherwise broadcasts a request to look-up the non-fungible token corresponding to the token smart contract 121 on the distributed ledger 118 using the token address 127 provided by the client application 136. The request or broadcast is received by the nodes 103 associated with the distributed ledger 118. For example, the distributed ledger client application 124b can make an application programming interface (API) call that includes the token address 127 to look-up the token smart contract 121 and obtain the token data 130 including the public key 133.

At block 324, the authentication service 147 validates the token data 130 by determining that the public key 133 corresponding to the private key 150 used to sign the cryptographic challenge is included in the token data 130 for the token smart contract 121 corresponding to the NFT. For example, if the public key 133 included in the token data 130 can be used to decrypt the signed cryptographic challenge, the authentication service 147 validates the token data 130 associated with the NFT. Further, the authentication service 147 verifies that the signed challenge corresponds to the challenge that was originally sent to the client device 112.

At block 327, the authentication service 147 authenticates the user and permits access to the requested content. For example, the authentication service 147 generates and transmits the user interface 156 and/or corresponding user interface code associated with the restricted and requested content. Thereafter, this portion of the process proceeds to completion.

Figure 4:
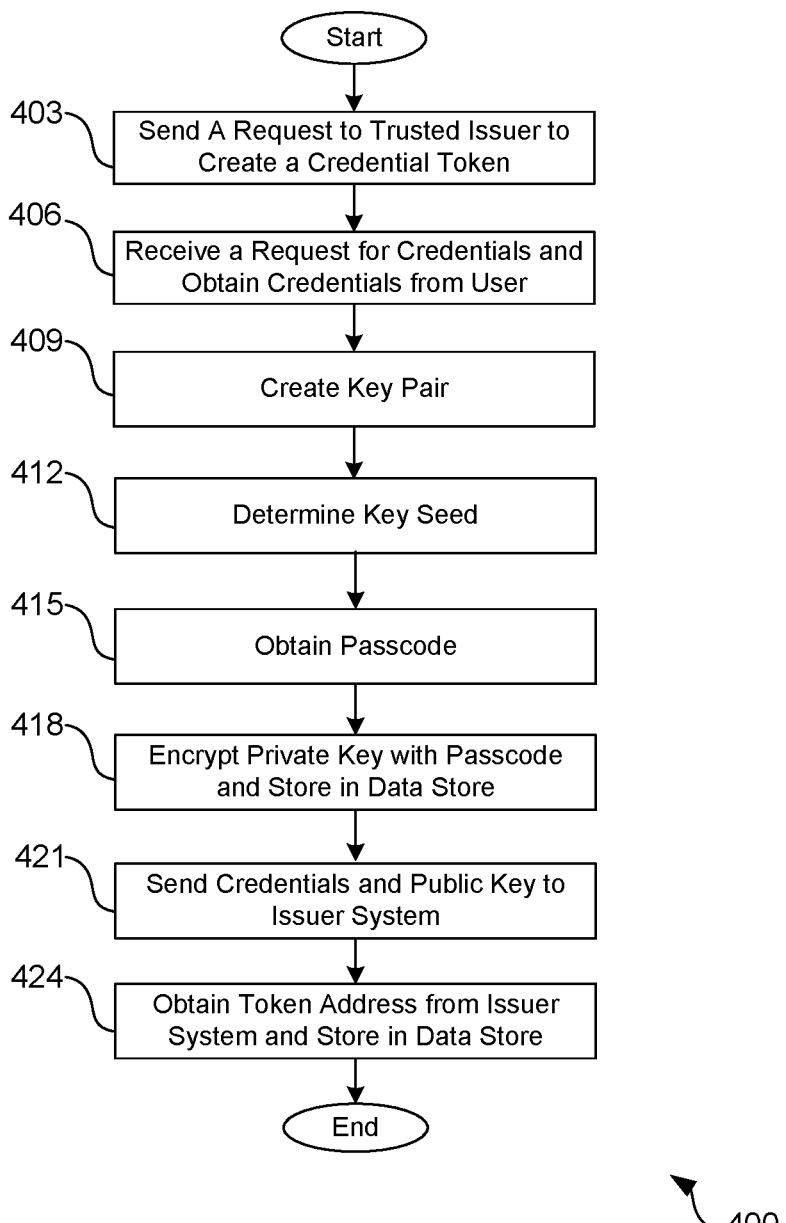
FIG. 4 is a flowchart illustrating an example of functionality implemented as a portion of the network environment of FIG. 1 according to various embodiments of the present disclosure. In particular.

Moving on to FIG. 4, shown is a flowchart 400 that provides one example of the operation of a portion of the client application 136. It is understood that the flowchart of FIG. 4 provides merely an example of the many different types of functional arrangements that can be employed to implement the operation of the depicted portion of the client application 136. As an alternative, the flowchart of FIG. 4 can be viewed as depicting an example of elements of a method implemented within the network environment 100.

Beginning with block 403, the client application 136 sends a create token request to the token issuer service 139 of a trusted token issuer system 106 requesting the creation of a non-fungible token for the user credentials. For example, the client application 136 renders a user interface 156 that facilitates a creation of an NFT that can be used for user authentication. A user interacting with the user interface 156 rendered on the client device 112 can select a component that generates the create token request and sends the created token request to the token issuer service 139.

At block 406, the client application 136 receives a request for credentials associated with the requesting user from the trusted issuer service 139. For example, the trusted issuer service 139 sends a request for identifying credentials associated with the user requesting the NFT. In various examples, the client application 136 renders a user interface 156 that facilitates the upload of credential data 143 associated with the user. Through user interactions with the user interface 156, the client application 136 obtains or otherwise uploads the credential data 143 (e.g., driver's license image, passport image, etc.) stored in a client data store 159 of the client device 112 via the user interface 156 associated with the client application. In some examples, the client application 136 interacts with an image capturing device associated with the client device 112 to capture or otherwise scan an image of the one or more credentials associated with the user.

At block 409, the client application 136 generates an asymmetric cryptographic key-pair comprising a public key 133 and a private key 150. The key-pair can be generated using various approaches, such as elliptic curve cryptography (ECC) approaches or using the Rivest-Shamir-Adleman (RSA) algorithm. The public key 133 and the private key 150 are used for authentication of the user with respect to the NFT in accordance to various embodiments. In particular, the public key 133 is used to create the NFT and the private key 150 remains on the client device 112 and is used to sign a cryptographic challenge received from an access provider system 109. In various examples, the access provider system 109 verifies the user by determining that the public key 133 associated with the NFT corresponds with the private key 150 used to sign the cryptographic challenge.

At block 412, the client application 136 determines a key seed. The key seed can be used to derive the private key 150. For example, the key seed can comprise a list of random words that can be converted to integers used to derive the asymmetric cryptographic key-pair comprising a public key 133 and a private key 150. In various examples, the client application 136 can generate a QR code or other type of visual identifier corresponding to the key seed. The words, QR code, or other type of visual identifier associated with the key seed can be rendered via a user interface 156 on a display 153 on the client device. The key seed can be printed via a printing device on a physical medium to provide the user with a hard copy of the key seed if the private key ever needs to be derived. In various examples, the key seed can be stored in a digital wallet and/or printed and stored by the user in physical storage (e.g., cold storage, a physical vault).

At block 415, the client application 136 obtains a passcode from the user interacting with the client application 136. For example, the client application 136 generates and renders a pop-up box or other type of user interface component requesting the user enter a particular passcode. The passcode comprises a numeric sequence of numbers (e.g., four to six digits) that is provided by the user.

At block 418, the client application 136 encrypts the private key 150 using the passcode provided by the user. The encrypted private key 150 is then stored in the client data store 159. The passcode is removed from the client device 112 to ensure security with respect to access of the private key 150. For example, the private key 150 can only be decrypted using the same passcode that was used to encrypt the private key 150.

At block 421, the client application 136 provides the credential data 143 and the public key to the token issuer service 139 on the trusted token issuer system 106. For example, the client application 136 transmits the credential data 143 and public key 133 over the network 115 to the token issuer service 139 in response to the request for credentials that was previously received from the token issuer service 139.

At block 424, the client application 136 obtains the token address 127 from the token issuer service 139. The client application 136 further stores the token address 127 in the client data store 159. During the authentication of a user by the access provider, the client application 136 provides the access provider system 109 the stored token address 127. Thereafter, this portion of the process proceeds to completion.

Referring next to FIG. 5, shown is a sequence diagram 500 that provides an example of the operation of the components of the network environment 100. It is understood that the sequence diagram 500 of FIG. 5 provides merely an example of the many different types of functional arrangements that can be employed to implement the operation of the depicted portion of the network environment 100. As an alternative, the sequence diagram 500 of FIG. 5 can be viewed as depicting an example of elements of a method implemented within the network environment 100. In particular, sequence diagram 500 of FIG. 5 depicts the functionality associated with the token issuer service 139 and the distributed ledger client application 124a of the token issuer system 106 according to various embodiments of the present disclosure.

Although the token issuer service 139 and the distributed ledger client application 124a are depicted as separate applications on the token issuer system 106, it is understood that the functionality of the distributed ledger client application 124a could be included in the functionality of the token issuer service 139. Likewise, it is understood that the functionality of the token issuer service 139 could be included in the functionality of the distributed ledger client application 124a.

At block 503, the token issuer service 139 receives a request from a client device 112 to create a non-fungible token in association with credentials of a user associated with the client device 112. In particular, a user interacting with a client application 136 that is in data communication with the token issuer service 139 over the network 115 can request for the creation of the non-fungible token to be used for authentication of the user.

At block 506, the token issuer service 139 sends a request for identifying credentials associated with the user requesting the NFT. In various examples, the token issuer service 139 can transmit user interface code that is executable by the client application 136 to generate, modify, and/or render a user interface 156 that facilitates the request for and upload of credential data 143 associated with the user.

At block 509, the token issuer service 139 obtains the credential data 143 and public key 133 associated with the requesting user from the client application 136. The credential data 143 can include one or more images of identification associated with the user such as, for example, a passport, a state-issued identification care, a driver's license, a military-issued identification card, and/or other type of permissible identification that the token issuer service 139 can use to verify an identity of the user.

At block 512, the token issuer service 139 analyzes the credential data 143 (e.g., government issued identification, passport, driver's license, etc.) to verify the identity of the requesting user or user account. For example, the token issuer service 138 can apply various image and text recognition techniques such as, for example, optical character recognition (OCR) to extract information from the credential data 143 for analysis to determine authenticity for user verification. Upon verification of the user following a review and confirmation of the identification, the token issuer service 139 can direct the distributed ledger client application 124a to create the NFT for the given user.

At block 515, the distributed ledger client application 124a creates the NFT for the given user by invoking the token smart contract 121 associated with the token issuer system 106. For example, the distributed ledger client application 124a makes an application programming interface (API) call that includes the public key 133 or other type of user identifier to invoke the token smart contract 121 that is associated the token issuer system 106. The token smart contract 121 executes on the nodes 103 of the distributed ledger 118 to create and record on the distributed ledger 118 the non-fungible token that is to be uniquely associated with the verified user and/or user account. In particular the mapping of the token smart contract 121 corresponding to the NFT includes a reference to the public key 133.

At block 518, the token issuer service 139 provides the token address 127 to the client application 136. The token address 127 is associated with the location of the token smart contract 121 corresponding to the NFT on the distributed ledger 118. In various examples, the token address 127 is publicly available and is further associated with the token issuer system 106. The token address 127 corresponds to a unique sequence of number, letters, and/or functions and refers to a specific destination associated with the token smart contract 121 corresponding to the NFT. Thereafter, this portion of the process proceeds to completion.

Referring next to FIG. 6, shown is a sequence diagram 600 that provides an example of the operation of the components of the network environment 100. It is understood that the sequence diagram 600 of FIG. 6 provides merely an example of the many different types of functional arrangements that can be employed to implement the operation of the depicted portion of the network environment 100. As an alternative, the sequence diagram 600 of FIG. 6 can be viewed as depicting an example of elements of a method implemented within the network environment 100. In particular, sequence diagram 600 of FIG. 6 depicts the functionality associated with the authentication service 147 and the distributed ledger client application 124b of the access provider system 109 according to various embodiments of the present disclosure.

Although the authentication service 147 and the distributed ledger client application 124b are depicted as separate applications on the access provider system 109, it is understood that the functionality of the distributed ledger client application 124b could be included in the functionality of the authentication service 147. Likewise, it is understood that the functionality of the authentication service 147 could be included in the functionality of the distributed ledger client application 124b.

Beginning with block 603, the authentication service 147 receives a request from the client application 136 to access to content that is provided by the access provider system 109 and requires authentication of the user before access to the content is permitted. For example, a user interacting with the client application 136 can request to access restricted content associated with a website of the access provider system 109 via one or more user interactions with a user interface 156 rendered on the display 153 of the client device 112. Prior to being provided the content by the access provider system 109, the requesting user must be authenticated.

At block 606, the authentication service 147 generates a cryptographic challenge unique to the request. The authentication service 147 sends the generated cryptographic challenge to client application 136. In various examples, the cryptographic challenge comprises an arbitrary sequence of alphanumeric characters, one or more random phrases, or other type of string of characters or phrases. In various examples, the authentication service 147 associates the cryptographic challenge created for the given request and/or user for later verification and avoidance of any type of replay attack.

At block 609, the authentication service 147 receives, from the client application 136, the signed challenge and token address 127 associated with the created NFT. For example, the client application 136 transmits the signed challenge and the token address 127 to the authentication service 147 over the network 115. The challenge is signed using the private key 150 that corresponds to the public key 133 used to create the NFT. The token address 127 is associated with the location of the token smart contract 121 corresponding to the NFT on the distributed ledger 118.

At block 612, the distributed ledger client application 124b looks-up the token data 130 using the token address 127. In particular, the distributed ledger client application 124b of the access provider system 109 uses the received token address 127 to look-up the token data 130 associated with the token smart contract 121 corresponding to the NFT for the user credentials. In various examples, the distributed ledger client application 124b sends or otherwise broadcasts a request to look-up the non-fungible token corresponding to the token smart contract 121 on the distributed ledger 118 using the token address 127 provided by the client application 136. The request or broadcast is received by the nodes 103 associated with the distributed ledger 118. For example, the distributed ledger client application 124b makes an application programming interface (API) call that includes the token address 127 to look-up the token smart contract 121 and obtain the token data 130 including the public key 133.

At block 615, the authentication service 147 determines whether the user is verified for authentication. In particular, the authentication service 147 validates the token data 130 by determining that the public key 133 corresponding to the private key 150 used to sign the cryptographic challenge is included in the token data 130 of the token smart contract 121 corresponding to the NFT. For example, if the public key 133 included in the token data 130 can be used to decrypt the signed cryptographic challenge, the authentication service 147 validates the token data 130 associated with the NFT. Further, the authentication service 147 verifies that the signed challenge corresponds to the challenge that was originally sent to the client device 112 for signature by comparing the signed challenge with the originally sent challenge. If the user is verified, the authentication service 147 proceeds to block 618. Otherwise, the authentication service 147 proceeds to block 621.

At block 618, the authentication service 147 authenticates the user and permits access to the requested content. For example, the authentication service 147 generates and transmits the user interface 156 and/or corresponding user interface code associated with the restricted and requested content. Thereafter, this portion of the process proceeds to completion.

At block 621, the authentication service 147 denies access to the requested content. For example, the authentication service 147 generates a notification indicating the denial of access and transmits the notification to the client device 112. The client device 112 can render the notification on the client device thereby notifying the user of the denied access. In some examples, the authentication service 147 provides alternate ways for the user to authenticate themselves in response to a denial of access. For example, the authentication service 147 facilitate authentication using traditional username and password techniques, as can be appreciated. Thereafter, this portion of the process proceeds to completion.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X and/or Y; X and/or Z; Y and/or Z; X, Y, and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

The invention claimed is:

1. A system, comprising:
a client device comprising a processor and a memory; and
machine-readable instructions stored in the memory that, when executed by the processor, cause the client device to at least:
receive a credential request for one or more identity credentials associated with a user of a user account, the credential request being received from a token issuer system in response to sending a token request for creation of a non-fungible token associated with the user account;
generate a key-pair comprising a private key and a public key;
transmit the public key and the one or more identity credentials to the token issuer system; and
receive a token address from the token issuer system, the token address corresponding to a location of the non-fungible token on a distributed ledger.

2. The system of claim 1, wherein, when executed, the machine-readable instructions further cause the client device to at least:
obtain a passcode from the user;
encrypt the private key using the passcode to create an encrypted private key; and
store the encrypted private key in a data store.

3. The system of claim 1, wherein, when executed, the machine-readable instructions further cause the client device to at least:
receive a cryptographic challenge from a content provider in response to sending an access request to the content provider to access content that requires authentication;
sign the cryptographic challenge with the private key;
send the cryptographic challenge signed with the private key and the token address to the content provider; and
receive access to the content in response to the content provider authenticating the user account based at least in part on the cryptographic challenge and the non-fungible token associated with the token address.

4. The system of claim 3, wherein a token issuer associated with the token issuer system is approved by the content provider to create the non-fungible token for authentication to access to the content.

5. The system of claim 3, wherein the private key is encrypted using a user-provided passcode and, when executed, the machine readable instructions further cause the client device to at least:
obtain the user-provided passcode from a user-interface prompt rendered on the client device; and
decrypt the private key using the user-provided passcode prior to signing the cryptographic challenge.

6. The system of claim 1, wherein the one or more identity credentials comprises one or more images of at least one of: a passport, a state-issued identification care, a driver's license, or a military-issued identification card.

7. The system of claim 1, wherein, when executed, the machine-readable instructions cause the client device to at least obtain the one or more identity credentials via a user interface rendered by the client device.

8. The system of claim 1, wherein, when executed, the machine-readable instructions cause the client device to at least provide a seed associated with the key-pair, the seed being printable for physical storage.

9. A method, comprising:
receiving a credential request for one or more identity credentials associated with a user of a user account, the credential request being received from a token issuer system in response to sending a token request for creation of a non-fungible token associated with the user account;
generating a key-pair comprising a private key and a public key;
transmitting the public key and the one or more identity credentials to the token issuer system; and
receiving a token address from the token issuer system, the token address corresponding to a location of the non-fungible token on a distributed ledger.

10. The method of claim 9, further comprising:
obtaining a passcode from the user;
encrypting the private key using the passcode to create an encrypted private key; and
storing the encrypted private key in a data store.

11. The method of claim 9, further comprising:
receiving a cryptographic challenge from a content provider in response to sending an access request to the content provider to access content that requires authentication;
signing the cryptographic challenge with the private key;
sending the cryptographic challenge signed with the private key and the token address to the content provider; and
receiving access to the content in response to the content provider authenticating the user account based at least in part on the cryptographic challenge and the non-fungible token associated with the token address.

12. The method of claim 11, wherein a token issuer associated with the token issuer system is approved by the content provider to create the non-fungible token for authentication to access to the content.

13. The method of claim 11, wherein the private key is encrypted using a user-provided passcode and, further comprising:
obtaining the user-provided passcode from a user-interface prompt rendered on the client device; and
decrypting the private key using the user-provided passcode prior to signing the cryptographic challenge.

14. The method of claim 9, wherein the one or more identity credentials comprises one or more images of at least one of: a passport, a state-issued identification care, a driver's license, or a military-issued identification card.

15. The method of claim 9, further comprising obtaining the one or more identity credentials via a user interface rendered by the client device.

16. The method of claim 9, further comprising providing a seed associated with the key-pair, the seed being printable for physical storage.

17. A non-transitory, computer-readable medium, comprising machine-readable instructions that, when executed by a processor of a computing device, cause the computing device to at least:
receive a credential request for one or more identity credentials associated with a user of a user account, the credential request being received from a token issuer system in response to sending a token request for creation of a non-fungible token associated with the user account;
generate a key-pair comprising a private key and a public key;
transmit the public key and the one or more identity credentials to the token issuer system; and
receive a token address from the token issuer system, the token address corresponding to a location of the non-fungible token on a distributed ledger.

18. The non-transitory computer-readable medium of claim 17, wherein the machine-readable instructions, when executed by the processor, further cause the computing device to at least:
obtain a passcode from the user;
encrypt the private key using the passcode to create an encrypted private key; and
store the encrypted private key in a data store.

19. The non-transitory computer-readable medium of claim 17, wherein the machine-readable instructions, when executed by the processor, further cause the computing device to at least:
receive a cryptographic challenge from a content provider in response to sending an access request to the content provider to access content that requires authentication;
sign the cryptographic challenge with the private key;
send the cryptographic challenge signed with the private key and the token address to the content provider; and
receive access to the content in response to the content provider authenticating the user account based at least in part on the cryptographic challenge and the non-fungible token associated with the token address.

20. The non-transitory computer-readable medium of claim 17, wherein the one or more identity credentials comprises one or more images of at least one of: a passport, a state-issued identification care, a driver's license, or a military-issued identification card.

\* \* \* \* \*